Nov. 25, 1924.

W. G. RUGGLES

EGG BEATER

Filed Sept. 18, 1922

WITNESSES

Inventor
WELLS G. RUGGLES

By Richard B. Owen
Attorney

Nov. 25, 1924.

W. G. RUGGLES 1,516,792

EGG BEATER

Filed Sept. 18, 1922

WITNESSES

Inventor
WELLS G. RUGGLES

By Richard B. Owen
Attorney

Patented Nov. 25, 1924.

1,516,792

UNITED STATES PATENT OFFICE.

WELLS G. RUGGLES, OF QUINCY, MASSACHUSETTS, ASSIGNOR TO DOVER STAMPING & MANUFACTURING COMPANY, OF CAMBRIDGE, MASSACHUSETTS, A CORPORATION OF MASSACHUSETTS.

EGG BEATER.

Application filed September 18, 1922. Serial No. 588,973.

*To all whom it may concern:*

Be it known that I, WELLS G. RUGGLES, a citizen of the United States, residing at Quincy, in the county of Norfolk and State of Massachusetts, have invented certain new and useful Improvements in Egg Beaters, of which the following is a specification.

The present invention relates to egg beaters and has for its principal object to provide an efficient agitating member, one which is simple in construction, inexpensive to manufacture, and reliable in operation.

Another important object of the invention is to provide a novel arrangement of the elements of the egg beater so as to form a compact and durable structure.

With the above and numerous other objects in view as will appear as the description progresses, the invention resides in certain novel features of construction, and the combination and arrangement of parts as will be hereinafter more fully described and claimed.

Figure 1:
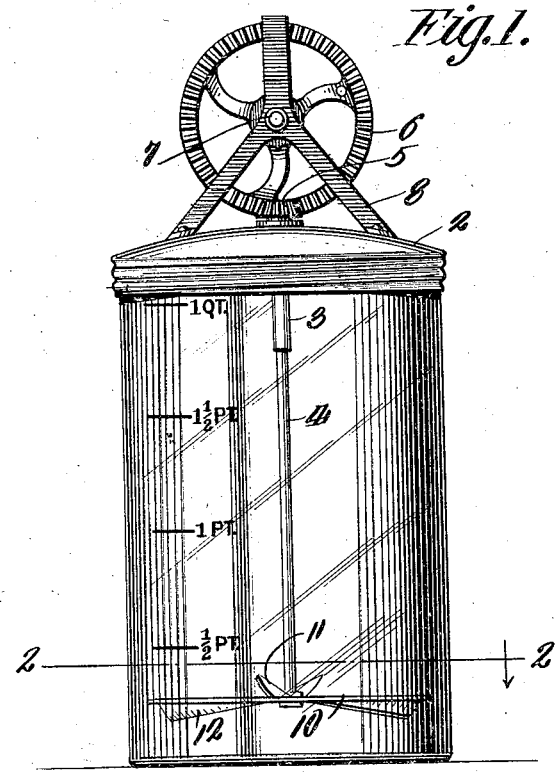
Figure 1 is an elevation of the egg beater embodying my invention.
Figure 2:
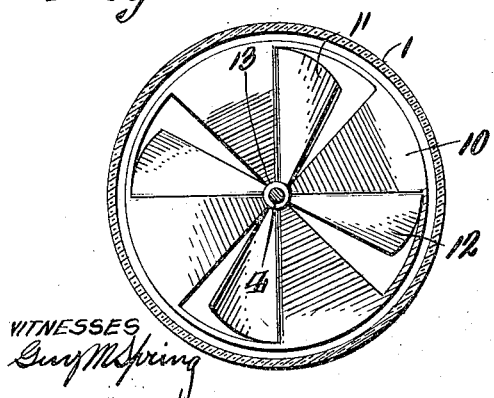
Figure 2 is a horizontal section taken therethrough on the line 2—2 of Figure 1 looking in the direction of the arrow.
Figure 3:
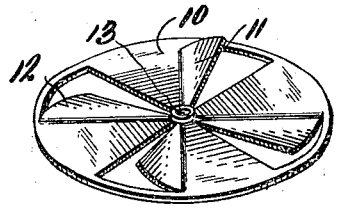
Figure 3 is a perspective of the agitating element.
Figure 5:
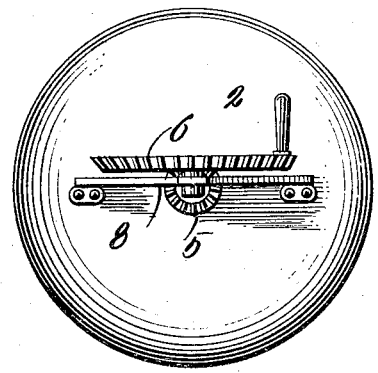
Figure 5 is a top plan thereof.
Figure 4:
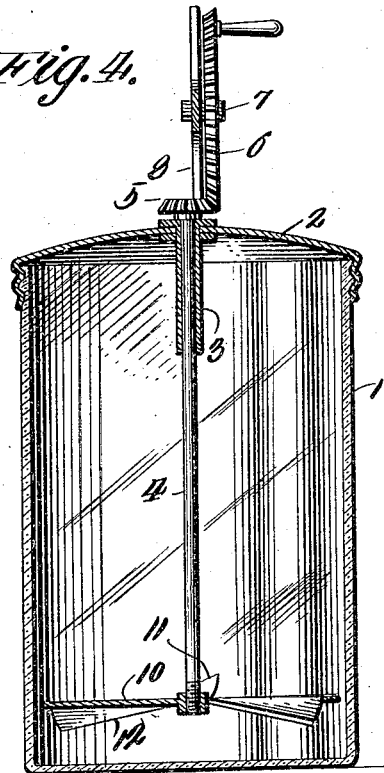
Figure 4 is a vertical longitudinal section through the egg beater.

Referring to the drawing in detail it will be seen that the jar 1 is preferably formed of glass or some other transparent material and has measuring indicia marked thereon. The upper end of the jar 1 is threaded so as to receive the cover 2 which is provided with a centrally located aperture for receiving the journal sleeve 3. This journal sleeve 3 rotatably receives the vertically disposed shaft 4 which is provided at its upper end with a beveled pinion 5 adapted to mesh with the beveled gears 6 mounted on the stub shaft 7 which is carried by the bracket 8 attached to the cover 2.

An agitating element is carried at the lower end of the shaft 4 and comprises a disk body 10 having a pair of upwardly struck diametrically opposed blades 11 and a pair of downwardly struck oppositely opposed blades 12. An internally threaded sleeve 13 is centrally disposed in the disk body 10 for receiving the lower threaded end of the shaft 4. There may be as many of the struck out blades 11 and 12 as may be desired, but it is preferred to have an equal number projecting above the disk body as projects below.

It is clear that the striking of these blades upward and downward will leave passages through the disk 10 and that the action of the blades as they move through the liquid will be to force the liquid through these passages, thus creating streams flowing upwardly and downwardly through the disk, which streams will have a tendency to intermingle freely with each other and with fresh liquid drawn in from the periphery of the disk so that the liquid is thoroughly agitated. As the agitator is rotated very rapidly air is drawn in from the upper surface of the liquid so that the liquid is thoroughly agitated.

Having thus described my invention what I claim as new is:—

1. A device of the kind described comprising a rotary shaft and an agitator attached thereto, said agitator comprising a disk having a series of blades struck therefrom, certain of said blades being struck downwardly and certain of said blades being struck upwardly, the free ends of all of said blades pointing in the same direction with relation to the direction of rotation of the agitator.

2. In a device of the kind described, an agitator comprising a thin metal disk having a rim and blades, all of said blades being struck to face in the same direction when said agitator is rotated and alternate blades being struck upward and downward whereby liquid passing through passages in said agitator formed by said blades will form streams at an acute angle to each other and after leaving said passages will violently intermingle.

3. A device of the kind described comprising a rotary shaft and means for rotating it, an agitator attached to said shaft to rotate therewith comprising a disk having passages therethrough and means located in proximity to said passages comprising blades, certain of said blades being directed upwardly and forwardly and other of said blades being directed downwardly and forwardly whereby during the rotation of said agitator liquid will be thrown upward through alternate passages and downward through other alternate passages.

In testimony whereof I affix my signature in presence of two witnesses.

WELLS G. RUGGLES.

Witnesses:
WILLIAM G. GANTER,
CHARLES S. RUGGLES.